United States Patent
Yokota et al.

(10) Patent No.: US 7,632,768 B2
(45) Date of Patent: Dec. 15, 2009

(54) CERAMICS SINTERED AND EXOTHERMIC BODY FOR METAL VAPOR DEPOSITION

(75) Inventors: Hiroshi Yokota, Fukuoka (JP); Fumio Tokunaga, Fukuoka (JP); Kentaro Iwamoto, Fukuoka (JP); Masamitu Kimura, Fukuoka (JP); Shoujiro Watanabe, Fukuoka (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 186 days.

(21) Appl. No.: 10/582,627

(22) PCT Filed: Dec. 10, 2004

(86) PCT No.: PCT/JP2004/018862

§ 371 (c)(1),
(2), (4) Date: May 31, 2007

(87) PCT Pub. No.: WO2005/056496

PCT Pub. Date: Jun. 23, 2005

(65) Prior Publication Data

US 2008/0020920 A1    Jan. 24, 2008

(30) Foreign Application Priority Data

Dec. 11, 2003    (JP)    ............... 2003-413533

(51) Int. Cl.
*C04B 35/583*    (2006.01)
*C04B 35/5835*    (2006.01)

(52) U.S. Cl. .................... 501/96.4; 501/96.3; 501/98.5; 392/386; 392/389

(58) Field of Classification Search ............... 501/96.3, 501/96.4, 98.4, 98.5; 252/520.21, 520.22, 252/521.4, 521.5; 392/388, 389
See application file for complete search history.

(56) References Cited

U.S. PATENT DOCUMENTS

| | | | |
|---|---|---|---|
| 3,181,968 A | 5/1965 | Mandorf, Jr. | |
| 3,236,663 A | 2/1966 | Grulke et al. | |
| 3,256,103 A * | 6/1966 | Roche et al | 501/96.3 |
| 3,544,486 A | 12/1970 | Passmore | |
| 4,514,355 A * | 4/1985 | Montgomery | 264/332 |
| 5,604,164 A * | 2/1997 | Montgomery et al. | 501/96.1 |
| 6,466,738 B2 * | 10/2002 | Jungling | 392/388 |
| 7,319,079 B2 * | 1/2008 | Rusinko et al. | 501/96.3 |
| 2002/0044770 A1 | 4/2002 | Jungling | |

FOREIGN PATENT DOCUMENTS

| | | | |
|---|---|---|---|
| DE | 19708509 | * | 9/1998 |
| JP | 43-15078 C2 | | 6/1968 |
| JP | 59-118828 A | | 7/1984 |
| JP | 60-21866 A | | 2/1985 |
| JP | 62-132798 A | | 6/1987 |
| JP | 63-201064 A | | 8/1988 |
| JP | 01-239066 A | | 9/1989 |
| JP | 03-208865 A | | 9/1991 |
| JP | 06298566 | * | 10/1994 |
| JP | 09-142934 A | | 6/1997 |
| JP | 2001-302352 A | | 10/2001 |
| JP | 2003-300779 A | | 10/2003 |

OTHER PUBLICATIONS

Notification of First Office Action in Chinese dated Dec. 7, 2007.

* cited by examiner

*Primary Examiner*—Karl E Group
(74) *Attorney, Agent, or Firm*—Young & Thompson

(57) ABSTRACT

A ceramics sintered body improved in corrosion resistance to a molten metal and a method for producing such a ceramics sintered body. The ceramics sintered body includes boron nitride, titanium diboride, a calcium compound and titanium nitride and having a relative density of 92% or more, wherein the content of the calcium compound in terms of CaO is from 0.05 to 0.8% by weight, and a peak intensity by X-ray diffraction of the (200) plane derived from titanium nitride is from 0.06 to 0.15 relative to a peak intensity of the (002) plane of BN. Further, a method for producing a ceramics sintered body, which is applicable to the ceramics sintered body, and an exothermic body for metal vapor deposition constituted by the ceramics sintered body are also disclosed.

9 Claims, No Drawings

CERAMICS SINTERED AND EXOTHERMIC BODY FOR METAL VAPOR DEPOSITION

TECHNICAL FIELD

The present invention relates to a ceramics sintered body, a method for producing the ceramics sintered body and an exothermic body for metal vapor deposition.

BACKGROUND ART

As an exothermic body for metal vapor deposition, there has hitherto been known a boat form (hereinafter referred to as a "boat") in which a cavity is formed in an upper surface of a ceramics sintered body mainly comprising, for example, boron nitride (BN), aluminum nitride (AlN) or titanium diboride ($TiB_2$) (patent document 1), and as an example of a commercially available product thereof, there is "BN Composite EC", a trade name, manufactured by Denki Kagaku Kogyo Kabushiki Kaisha. There is also a form having no cavity. As for the usage of these, both ends of the boat are connected to electrodes with clamps, and voltage is applied thereto, which allows it to generate heat to melt and evaporate a metal such as aluminum wire rods fed in the cavity, thereby obtaining a vapor deposition film, followed by cooling.

In such a boat, the molten metal corrodes the boat to fluctuate the effective sectional area and electric resistance, resulting in failure to give a sufficient vapor deposition speed. For example, when the molten metal is aluminum, corrosion occurs according to the following reaction equations:

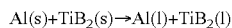
$Al(s)+TiB_2(s) \rightarrow Al(l)+TiB_2(l)$

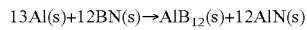
$13Al(s)+12BN(s) \rightarrow AlB_{12}(s)+12AlN(s)$

Further, the corrosion locally occurs at a cavity portion in many cases, that is, spreading by wetting of molten aluminum is localized to a center portion of the cavity. Accordingly, the film thickness distribution of a material to be vapor deposited comes failed to be sufficiently given, reaching the end of life. In order to prolong the boat life, what is necessary is just to increase the relative density of the boat to 95% or more (patent document 2). However, this necessitates a high pressure as high as 100 to 300 MPa, so that the cost of equipment increases, and productivity is also inferior. On the other hand, there is also a proposal of devising a method for cutting out of a hot press sintered body so that anisotropy does not occur in crystal orientation of BN in the boat (patent document 3). However, in spite of these improvements, the above-mentioned reactions gradually proceed under high temperature during aluminum vapor deposition, and there has been still room for prolonging the life.

[Patent Document 1] JP-B-53-20256
[Patent Document 2] JP-A-60-21866
[Patent Document 3] JP-B-5-66906

DISCLOSURE OF THE INVENTION

In view of the above-mentioned problems involved in the conventional art, the present inventors have further made studies. As a result, it has been found that when a mixed raw material powder containing a specific low crystalline BN powder is used and sintered while crystallizing it, titanium nitride exists in a grain boundary phase of the resulting sintered body to provide a grain boundary phase different from a conventional grain boundary phase which is amorphous and has a large amount of oxygen and with which the progress of corrosion is accelerated, thus completing the invention. In general, almost of ceramics materials has a form called a polycrystal in which grains having a size of several micrometers to several tens of micrometers are bonded by sintering, and the grain boundary phase is a portion in which impurities of a raw material powder are concentrated among the grains, in many cases.

That is, the invention relates to a ceramics sintered body comprising boron nitride, titanium diboride, a calcium compound and titanium nitride and having a relative density of 92% or more, wherein the content of the calcium compound in terms of CaO is from 0.05 to 0.8% by weight, and a peak intensity by X-ray diffraction of the (200) plane derived from titanium nitride is from 0.06 to 0.15 relative to a peak intensity of the (002) plane of BN. In this case, it is preferred that a part or all of the titanium nitride exists in a grain boundary phase. Besides, it is preferred that aluminum nitride is further contained. Further, it is particularly preferred that the conditions that the boron nitride crystal contained in the ceramics sintered body has a C-axis lattice constant of 6.675 angstroms or less and that the ceramics sintered body has an oxygen amount of from 1 to 2% by weight are satisfied at the same time.

Further, the invention relates to an exothermic body for metal vapor deposition, which is constituted by the above-mentioned ceramics sintered body.

Furthermore, the invention is a method for producing a ceramics sintered body comprising sintering a mixed raw material powder containing a titanium diboride powder, a boron nitride powder, a calcium-based sintering aid and optionally an aluminum nitride powder, in a non-oxidative atmosphere at a temperature of 1800 to 2100° C., wherein the above-mentioned boron nitride powder has a C-axis lattice constant of a boron nitride crystal of 6.690 angstroms or less, a cumulative average diameter of 4 to 20 μm, a BET specific surface area of 25 to 70 m²/g, and an oxygen amount of 1.0 to 2.5% by weight, and the above-mentioned mixed raw material powder contains a calcium-based sintering aid in an amount of from 0.09 to 0.8% by weight in terms of CaO. In this case, it is preferred that the calcium-based sintering aid is at least one member selected from CaO, $Ca(OH)_2$ and $CaCO_3$.

According to the invention, there are provided a ceramics sintered body improved in corrosion resistance to a molten metal, and a method for producing a ceramics sintered body, which is applicable to the production thereof. Further, there is provided an exothermic body which can achieve the prolonged life.

BEST MODE FOR CARRYING OUT THE INVENTION

Main components constituting the ceramics sintered body of the invention are boron nitride and titanium diboride. The ceramics sintered body can be made insulative and conductive thereby, and becomes suitable, for example, for applications such as an exothermic body for metal vapor deposition. In this case, boron nitride functions as an insulating material, so that it can be replaced by aluminum nitride, which is also an insulating material, up to a maximum of 50% by weight thereof. Thereby, conducting characteristics are improved and it becomes possible to decrease the cost. Illustrating an example of the constituent ratio of the main components, boron nitride is from 40 to 55% by weight, titanium diboride is from 45 to 60% by weight, and aluminum nitride is from 0 to 20% by weight. It is preferred that these main components have a content of 95% or more by weight in the ceramics sintered body.

On the other hand, components other than the above-mentioned main components which constitute the ceramics sintered body of the invention are a calcium compound and titanium nitride. The calcium compound is a component necessary for adjusting the relative density of the ceramics sintered body to 92% or more, and the content thereof is from 0.05 to 0.8% by weight in terms of CaO. Less than 0.05% by weight results in difficulty to adjust the relative density to 92% or more, whereas more than 0.8% by weight results in the possibility of bringing about seizing with a jig or the like during sintering of the ceramics. The requirement of a relative density of 92% or more is necessary for making the corrosion resistance of the ceramics sintered body sufficient.

Titanium nitride is a component for imparting corrosion resistance to the ceramics sintered body, and it is preferred from the viewpoint of improvement in corrosion resistance that at least a part thereof is allowed to exist in a grain boundary phase. The existence of TiN in the a grain boundary phase can be confirmed by using the state of element distribution by an EPMA (X-ray microanalyzer) at a cross-sectional ground portion in combination with a powder X-ray diffraction method. The peak intensity by X-ray diffraction of the (200) plane derived from titanium nitride is adjusted to a ratio of 0.06 to 0.15 relative to the peak intensity of the (002) plane of BN. That is, the X-ray peak intensity ratio (TiN (200) plane/BN (002) plane) is adjusted to a ratio of 0.06 to 0.15. When this ratio is less than 0.06, the effect of improving corrosion resistance is insufficient. When it is more than 0.15, the ceramics sintered body becomes too hard, resulting in deterioration of processability.

The reason why the corrosion resistance of the ceramics sintered body is improved by allowing TiN to exist in at least the grain boundary phase is explained by that the affinity of TiN for a molten metal is smaller than that of the other constituents ($B_2O_3$, $TiO_2$ and $Al_2O_3$) of the grain boundary phase. That is, making an explanation referring to a case where the molten metal is aluminum as an example, when free energy G in forming Al—X (X=grain boundary constituent) is determined at a temperature of 1000° C. at which Al is thermodynamically spread by wetting, it is −56.1 kJ/mol for Al—$B_2O_3$, and −83.7 kJ/mol for Al—$TiO_2$. In contrast, it is −12.2 kJ/mol for Al—TiN, and TiN is small in affinity for Al to thereby improve the corrosion resistance.

In the ceramics sintered body of the invention, the corrosion resistance is further improved by satisfying the conditions that the oxygen amount thereof is from 1 to 2% by weight and that the C-axis lattice constant of a boron nitride crystal contained in the ceramics sintered body is 6.675 angstroms or less, at the same time. That is, when the C-axis lattice constant becomes larger than 6.675 angstroms, BN comes to have a low crystallinity and a large crystal strain, so that it becomes easy to receive corrosion due to the molten metal. Further speaking, a BN grain low in crystallinity contains solid solution oxygen and stacking fault in large amounts, and such structural defects in the grain become starting points of corrosion due to the molten metal. There is no limitation on the lower limit of the C-axis lattice constant, and it is possible up to 6.662 angstroms of the theoretical value. Higher crystallinity is preferred because of stronger corrosion resistance.

Further, explaining the reason why the oxygen content of the ceramics sintered body is preferably from 1 to 2% by weight, it has been proved that oxygen mainly exists in a clearance between BN (AlN) and the $TiB_2$ grain, which is a grain boundary, in the ceramics sintered body of the invention, and the melting point thereof is generally low, compared to BN, AlN and $TiB_2$. When the oxygen amount exceeds 2% by weight, the grain boundary phase having a low melting point forms a liquid phase at a working temperature of the ceramics sintered body such as the boat, and the reaction with the molten metal and the like becomes liable to occur, resulting in impairment of corrosion resistance. On the other hand, when the oxygen amount is less than 1% by weight, the intergranular bonding force between BN (AlN) and TiB2 becomes insufficient, resulting in impairment of corrosion resistance.

The method for producing a ceramics sintered body of the invention is adapted to the production of the ceramics sintered body of the invention. This will be described below.

The mixed raw material powder used in the invention contains a titanium diboride powder (hereinafter also referred to as a "$TiB_2$ powder"), a boron nitride powder (hereinafter also referred to as a "BN powder") and a calcium-based sintering aid, and optionally containing an aluminum nitride powder (hereinafter also referred to as an "AlN powder"). The constituent ratios of the components before and after sintering scarcely vary, so that the mixing ratio of the respective powders can be made the same as the above-mentioned constituent ratio of the ceramics sintered body. Although such a mixed raw material powder has hitherto been used, important in the invention is to use the specific low crystalline BN powder, and to sinter the low crystalline BN powder while crystallizing it, in the presence of a specific amount of the calcium-based sintering aid.

The BN powder used in the invention is one having a C-axis lattice constant of a boron nitride crystal of 6.690 angstroms or less, a cumulative average diameter of 4 to 20 μm, a BET specific surface area of 25 to 70 $m^2/g$, and an oxygen amount of 1.0 to 2.5% by weight. The "cumulative average diameter" referred to in the invention means the grain size ($D_{50}$) at a number-conversion cumulative percentage of 50%.

The BN powders are commercially available widely from a low crystalline one to a high crystalline one. However, it was found that there is a limit in the effect of improving the corrosion resistance with the use of the high crystalline BN powder which has hitherto been considered to be suitable. Consequently, in the invention, a level of the corrosion resistance with the conventional high crystalline BN powder can be surpassed by using the low-oxygen and low crystalline BN powder having an oxygen amount of 1.0 to 2.5% by weight and a C-axis lattice constant of 6.690 angstroms or less. Further, this effect is promoted by adjusting the grain size to a cumulative average diameter of 4 to 20 μm and a BET specific surface area of 25 to 70 $m^2/g$.

That is, it has been found out that when the mixed raw material powder containing the above-mentioned low-oxygen and low crystalline BN powder is sintered in the presence of a specific amount of the calcium-based sintering aid under the specific conditions, the grain boundary phase of the resulting ceramics sintered body becomes one in which TiN is a main phase, that is, the above-mentioned X-ray peak intensity ratio (TiN (200) plane/BN (002) plane) of the ceramics sintered body becomes 0.06 to 0.15 to improve the corrosion resistance. Although the mechanism of TiN phase formation is not known exactly, it is conceivable that $TiO_2$ which is a surface oxide layer of the $TiB_2$ grain reacts with $B_2O_3$ which exists on a surface of the BN powder in the course of sintering to form a liquid phase, in which the BN grain is dissolved and reprecipitated, and concurrently therewith, $TiO_2$ is nitrided to form TiN.

In the invention, when the C-axis lattice constant of the BN powder exceeds 6.690 angstroms, low crystalline BN remains in the resulting ceramics sintered body to fail to improve the corrosion resistance. When the cumulative average diameter is less than 4 μm, it becomes difficult to control the oxygen amount to 2.5% or less by weight. When the cumulative average diameter exceeds 20 μm, or when the BET specific surface area is less than 25 m$^2$/g, the ceramics sintered body having a relative density of 92% or more cannot be produced. When the BET specific surface area exceeds 70 m$^2$/g, the formed article density before sintering decreases, also resulting in failure to produce the ceramics sintered body having a relative density of 92% or more. When the oxygen amount of the BN powder is less than 1.0% by weight, the oxygen amount necessary for sintering is insufficient, and exceeding 2.5% by weight results in excessive precipitation of oxygen in the grain boundary phase to cause insufficient corrosion resistance.

The BN powder used in the invention can be produced, for example, by a method of heating a mixture of borax and urea in an ammonium atmosphere to 800° C. or higher, a method of heating boric acid or a mixture of boron oxide and calcium phosphate and a nitrogen-containing compound such as ammonium or a dicyanamide to 1300° C. or higher, and the like. In any BN powder, the adjustment of the oxygen amount to 1.0 to 2.5% by weight is performed by heat treatment under a non-oxidative atmosphere such as nitrogen or argon at a temperature of 1100 to 1300° C. for 3 to 5 hours. When the heat treatment temperature exceeds 1300° C., the C-axis lattice constant of the BN powder becomes less than 6.690 angstroms to form a high crystalline BN powder. In addition, it is preferred to wash with a dilute acid such as 0.1-1% nitric acid after the heat treatment.

When the content of the calcium-based sintering aid in the mixed raw material powder is less than 0.09% by weight in terms of CaO, it becomes difficult to sinter the low crystalline BN powder while crystallizing it. On the other hand, when it exceeds 0.8% by weight, it remains in an increased amount in the grain boundary, resulting in insufficient corrosion resistance. As the calcium-based sintering aids, there are used, for example, nitrides such as $CaCN_2$ and calcium nitrate, and substances which are changed to calcium oxides by heating, for example, such as α-$Ca_3(PO_4)_2$ and $Ca_4(PO_4)_2O$, as well as various calcium oxides. Preferred are CaO, Ca(OH)$_2$ and $CaCO_3$. It is preferred that the average grain size of the calcium-based sintering aid is 0.8 μm or less, and particularly 0.5 μm or less.

As the TiB$_2$ powders and the AlN powders, there are used one produced by subjecting a Ti powder or an Al powder to a direct nitriding reaction or a direct boriding reaction, one produced by subjecting a TiO$_2$ powder or a powder of Al$_2$O$_3$ to a reduction nitriding reaction or a reduction boriding reaction, and the like. The average grain size is preferably from 5 to 25 μm. Commercially available products are sufficiently usable as these.

The mixed raw material powder is sintered in a non-oxidative atmosphere at 1800 to 2100° C., preferably after granulated. For example, after uniaxial pressurization or cold isotropic pressure pressurization, it is sintered at ordinary pressure at a temperature of 1800 to 2100° C., or sintered in a gas atmosphere of 0.8 MPa or less. Further, it can also be sintered with a hot press or hot isotropic pressure press of 1 to 100 MPa at 1800 to 2100° C. When the sintering temperature is lower than 1800° C., sintering becomes insufficient. On the other hand, exceeding 2100° C. results in failure to produce the ceramics sintered body having a relative density of 92% or more. As the non-oxidative atmosphere, there is used an atmosphere of nitrogen, argon, carbon dioxide gas, ammonia or the like.

It is desirable that the powder is put in a graphite-made crucible, a boron nitride-made crucible or a crucible lined with boron nitride, and sintered in a non-oxidative atmosphere. In the hot press process, sintering is performed using a graphite-made or boron nitride-made sleeve or a sleeve lined with boron nitride.

When the exothermic body for metal vapor deposition, for example, a boat, of the invention is produced from the ceramics sintered body, it is processed into an appropriate form by a conventional method. Illustrating an example of the dimension thereof, it is a strip form of 130-150 mm long×25-35 mm wide×8-12 mm high. In the case of the boat, a cavity (90-120 mm long×20-32 mm wide×0.5-2.0 deep) is formed in a central portion on an upper surface thereof. The processing is performed by machining, lasering or the like.

EXAMPLES

Examples 1 to 10 and Comparative Examples 1 to 7

A TiB$_2$ powder (average grain size: 12 μm, purity: 99.9% or more by weight), an AlN powder (average grain size: 10 μm, purity: 98.5% by weight), a CaO powder (average grain size: 0.5 μm, purity: 99.9% or more by weight) and various BN powders shown in Table 1 were mixed at ratios shown in Table 1 to prepare various mixed raw material powders. The various BN powders as used herein were produced by heat treating a BN powder obtained by heating a mixture of borax and urea in an ammonium atmosphere, variously changing heat treatment conditions of 1100 to 1300° C. for 3 to 5 hours under a nitrogen atmosphere. This was filled in a graphite die and hot pressed under conditions shown in Table 2 in a nitrogen atmosphere to produce a ceramics sintered body (a column form of 200 mm in diameter by 20 mm high).

A rectangular parallelepiped (150 mm long×30 mm wide×10 mm thick) was cut out of this ceramics sintered body, and a cavity (26 mm wide×1 mm deep×120 mm long) was formed in a central portion on a surface thereof by machining to prepare a boat. Then, (1) the corrosion resistance and (2) the life of the boat were measured according to the following.

(1) Corrosion Resistance: Ends of the boat were connected to electrodes with clamps, and the applied voltage was set so that the temperature of a central portion of the cavity was adjusted to 1500° C. A process of performing vapor deposition while feeding an aluminum wire with a diameter of 1.5 mm to the cavity at a constant speed of 6.5 g/minute for 40 minutes, in a vacuum having a degree of vacuum of 2×10$^{-2}$ Pa, followed by cooling to room temperature was taken as one cycle, and repeated. In each cycle, a sample was taken out, and the depth of the most corroded of the cavity portion was measured by using a laser displacement meter (instrument: "LT-9000" manufactured by Keyence Corporation). The rate at which the boat was corroded for 40 minutes was determined. It can be said that the lower corrosion rate shows the ceramics sintered body better in corrosion resistance.

(2) Boat Life: A cycle of performing vapor deposition on a resin film at a position 200 mm above the boat based on the conditions of the above-mentioned corrosion resistance test was repeated, and the number of cycles at the time when the thickness of an aluminum vapor deposited film came to be 2000 angstroms per 1 cycle was determined. It was taken as the life of the boat.

Further, the relative density of the ceramics sintered body, the C-axis lattice constant of BN, the oxygen amount, the calcium compound amount, the grain boundary phase and the above-mentioned X-ray peak intensity ratio (TiN (200) plane/BN (002) plane) were measured according to the following.

Those results are shown in Table 2.

(3) Relative Density: It was calculated from the measured density and the theoretical density. From the viewpoints of the accuracy of a measured value obtained and reproducibility, the measured density is generally measured according to the Archimedes method. The theoretical density indicates a value determined by the bulk specific gravity and compounding ratio of the raw materials to be blended.

(4) C-Axis Lattice Constant: A sample was measured by a powder X-ray diffraction method (instrument: "RAD-B" manufactured by Rigaku Corporation) under the conditions of 40 kV and 100 mA at 2θ within the range of 10° to 70°, and the C-axis lattice constant of a BN crystal was determined by calculating it by the Rietveld method. As for a general method for pulverizing the sintered body to a powder, it is pulverized in a agate mortar several times, and small pieces thereof are ground in the mortar to miniaturize them. Further, the fine powder is passed through a sieve of about 200 meshes, thereby being able to prepare the sample suitable for the powder X-ray diffraction method.

(5) Oxygen Amount: It was measured with a nitrogen/oxygen analyzer (programmed temperature analysis) (instrument: "TC-436" manufactured by LECO Corporation).

(6) Calcium Compound Amount: It was determined by using an inductively coupled plasma optical emission spectrometer ("ICP-AES, MODEL ICAP-1000S" manufactured by Nippon Jarrel Ash).

(7) Grain Boundary Phase: As for the presence of TiN in the grain boundary phase, the boat was processed into a cross sectional form 5 mm in diameter, the state of element distribution was measured with an EPMA (X-ray microanalyzer) for a ground portion of the cross section, and further, the grain boundary phase was identified by the powder X-ray diffraction method.

(8) X-Ray Peak Intensity Ratio (TiN (200) Plane/BN (002) Plane): It was determined from the results of the above-mentioned powder X-ray diffraction.

TABLE 1

| | | BN Powder | | | | | | |
|---|---|---|---|---|---|---|---|---|
| | | C-Axis Lattice Constant (Å) | BET Specific Surface Area (m²/g) | Cumulative Average Diameter (μm) | Oxygen Amount (% by weight) | BN Powder Content (% by weight) | $TiB_2$ Powder Content (% by weight) | AlN Powder Content (% by weight) | CaO Powder Content (% by weight) |
| Example | 1 | 6.678 | 29 | 4.2 | 1.1 | 30.30 | 49.50 | 19.50 | 0.70 |
| | 2 | 6.681 | 45 | 4.3 | 1.6 | 30.30 | 49.50 | 19.50 | 0.70 |
| | 3 | 6.677 | 32 | 18.5 | 1.0 | 30.30 | 49.50 | 19.50 | 0.70 |
| | 4 | 6.688 | 68 | 4.0 | 2.4 | 30.30 | 49.50 | 19.50 | 0.70 |
| | 5 | 6.678 | 29 | 4.2 | 1.1 | 30.30 | 49.50 | 20.11 | 0.09 |
| | 6 | 6.678 | 29 | 4.2 | 1.1 | 30.30 | 49.50 | 19.50 | 0.70 |
| | 7 | 6.671 | 29 | 4.2 | 1.1 | 25.20 | 47.50 | 26.60 | 0.70 |
| | 8 | 6.688 | 54 | 8.3 | 2.4 | 30.30 | 49.50 | 19.50 | 0.70 |
| | 9 | 6.674 | 29 | 4.2 | 1.1 | 30.30 | 49.50 | 19.50 | 0.70 |
| | 10 | 6.678 | 29 | 4.2 | 1.1 | 48.20 | 51.00 | 0.00 | 0.80 |
| Comparative Example | 1 | 6.692 | 29 | 4.2 | 1.1 | 30.30 | 49.50 | 19.50 | 0.70 |
| | 2 | 6.678 | 24 | 4.2 | 1.1 | 30.30 | 49.50 | 19.50 | 0.70 |
| | 3 | 6.678 | 72 | 4.1 | 1.1 | 30.30 | 49.50 | 19.50 | 0.70 |
| | 4 | 6.678 | 68 | 3.0 | 2.6 | 30.30 | 49.50 | 19.50 | 0.70 |
| | 5 | 6.678 | 32 | 25.3 | 1.2 | 30.30 | 49.50 | 19.50 | 0.70 |
| | 6 | 6.678 | 29 | 4.2 | 3.5 | 30.30 | 49.50 | 19.50 | 0.70 |
| | 7 | 6.678 | 29 | 4.2 | 1.1 | 30.30 | 49.50 | 20.20 | 0.00 |
| | 8 | 6.678 | 29 | 4.2 | 1.1 | 30.30 | 49.50 | 19.50 | 0.70 |
| | 9 | 6.678 | 29 | 4.2 | 1.1 | 30.30 | 49.50 | 19.50 | 0.70 |
| | 10 | 6.678 | 29 | 4.2 | 0.7 | 30.30 | 49.50 | 19.50 | 0.70 |
| | 11 | 6.678 | 29 | 4.2 | 1.1 | 30.30 | 49.50 | 19.50 | 1.00 |

TABLE 2

| | | Characteristics of Ceramics Sintered Body | | | | | | | | |
|---|---|---|---|---|---|---|---|---|---|---|
| | | Sintering Condition | | | C-Axis Lattice Constant of BN (Å) | Oxygen Amount (% by weight) | Calcium Compound Content (% by weight in terms of CaO) | Grain Boundary Phase | Peak Intensity Ratio of TiN and BN ($I_{TiN(200)}/I_{BN(002)}$) | Corrosion Rate (μm/min) | Life (cycles) |
| | | Hot Press Pressure (MPa) | Sintering Temperature (° C.) | Relative Density (%) | | | | | | | |
| Example | 1 | 25 | 2000 | 96.5 | 6.668 | 1.45 | 0.65 | TiN | 0.12 | 4.21 | 18 |
| | 2 | 25 | 2000 | 96.9 | 6.664 | 1.52 | 0.66 | TiN | 0.09 | 5.02 | 17 |
| | 3 | 25 | 2000 | 95.8 | 6.672 | 1.43 | 0.68 | TiN | 0.10 | 5.11 | 17 |
| | 4 | 25 | 2000 | 97.4 | 6.667 | 1.98 | 0.60 | TiN | 0.11 | 4.01 | 19 |
| | 5 | 25 | 2000 | 94.8 | 6.675 | 1.86 | 0.05 | TiN, $TiO_2$ | 0.06 | 5.68 | 15 |
| | 6 | 25 | 1900 | 95.5 | 6.671 | 1.74 | 0.64 | TiN | 0.09 | 5.55 | 16 |
| | 7 | 25 | 2000 | 97.1 | 6.674 | 1.88 | 0.65 | TiN | 0.10 | 4.55 | 18 |
| | 8 | 25 | 2000 | 97.3 | 6.670 | 1.97 | 0.66 | TiN | 0.11 | 5.12 | 17 |
| | 9 | 30 | 2000 | 97.7 | 6.669 | 1.31 | 0.66 | TiN | 0.14 | 5.23 | 17 |
| | 10 | 20 | 2100 | 97.1 | 6.662 | 1.15 | 0.77 | TiN | 0.06 | 4.11 | 19 |

TABLE 2-continued

| | | Sintering Condition | | | C-Axis | | Calcium Compound | | | | |
|---|---|---|---|---|---|---|---|---|---|---|---|
| | | Hot Press Pressure (MPa) | Sintering Temperature (° C.) | Relative Density (%) | Lattice Constant of BN (Å) | Oxygen Amount (% by weight) | Content (% by weight in terms of CaO) | Grain Boundary Phase | Peak Intensity Ratio of TiN and BN ($I_{TiN(200)}/I_{BN(002)}$) | Corrosion Rate (μm/min) | Life (cycles) |
| Comparative Example | 1 | 25 | 2000 | 94.3 | 6.686 | 1.75 | 0.65 | $TiO_2$ | 0.00 | 8.52 | 8 |
| | 2 | 25 | 2000 | 91.3 | 6.678 | 1.83 | 0.68 | TiN | 0.05 | 8.32 | 10 |
| | 3 | 25 | 2000 | 90.5 | 6.678 | 1.88 | 0.60 | TiN | 0.04 | 6.98 | 10 |
| | 4 | 25 | 2000 | 94.9 | 6.675 | 2.33 | 0.61 | amorphous | 0.00 | 10.34 | 8 |
| | 5 | 25 | 2000 | 90.1 | 6.678 | 1.25 | 0.52 | $TiO_2$ | 0.00 | 12.22 | 6 |
| | 6 | 25 | 2000 | 95.4 | 6.675 | 2.47 | 0.62 | $TiO_2$ | 0.00 | 9.67 | 8 |
| | 7 | 25 | 2000 | 91.1 | 6.678 | 2.02 | 0.00 | amorphous | 0.00 | 9.45 | 9 |
| | 8 | 25 | 2150 | 91.5 | 6.668 | 0.90 | 0.34 | TiN | 0.12 | 8.57 | 7 |
| | 9 | 25 | 1750 | 87.3 | 6.678 | 2.02 | 0.04 | amorphous | 0.02 | 14.53 | 6 |
| | 10 | 25 | 2000 | 86.5 | 6.677 | 1.78 | 0.02 | amorphous | 0.00 | 15.28 | 6 |
| | 11 | 25 | 2000 | 97.2 | 6.664 | 2.31 | 0.85 | TiN | 0.13 | 8.99 | 9 |

As shown in Tables 1 and 2, it is revealed that the corrosion rate of the ceramics sintered body of the invention is suppressed to 6 μm/min or less, so that corrosion resistance is significantly improved, and that the boat prepared using the same has a long life of 15 cycles or more.

While the present invention has been described in detail and with reference to specific embodiments thereof, it will be apparent to one skilled in the art that various changes and modifications can be made therein without departing from the spirit and scope thereof.

This application is based on Japanese Patent Application No. 2003-413533 filed on Dec. 11, 2003, the contents thereof being herein incorporated by reference.

INDUSTRIAL APPLICABILITY

The ceramics sintered body of the invention can be used, for example, as an exothermic body for metal vapor deposition such as a boat, and further, the exothermic body for metal vapor deposition of the invention can be used, for example, as a jig in vapor depositing metals such as aluminum, copper, silver and zinc onto substrates such as films or ceramics.

The invention claimed is:

1. A ceramics sintered body comprising boron nitride, titanium diboride, a calcium compound and titanium nitride and having a relative density of 92% or more, wherein the content of the calcium compound in terms of CaO is from 0.05 to 0.8% by weight, a part or all of the titanium nitride exists in a grain boundary phase, and a peak intensity by X-ray diffraction of the (200) plane derived from titanium nitride is from 0.06 to 0.15 relative to a peak intensity of the (002) plane of BN.

2. The ceramics sintered body according to claim 1, further containing aluminum nitride.

3. The ceramics sintered body according to claim 1, wherein the boron nitride crystal contained in the ceramics sintered body has a C-axis lattice constant of 6.675 angstroms or less, and the ceramics sintered body has an oxygen amount of from 1 to 2% by weight.

4. The ceramics sintered body according to claim 1, having a total content of boron nitride and titanium diboride of 95% or more by weight.

5. The ceramics sintered body according to claim 2, having a total content of boron nitride, titanium diboride and aluminum nitride of 95% or more by weight.

6. An exothermic body for metal vapor deposition which is constituted by the ceramics sintered body according to claim 1.

7. The ceramics sintered body according to claim 3, further containing aluminum nitride.

8. The ceramics sintered body according to claim 4, wherein the boron nitride crystal contained in the ceramics sintered body has a C-axis lattice constant of 6.675 angstroms or less, and the ceramics sintered body has an oxygen amount of from 1 to 2% by weight.

9. The ceramics sintered body according to claim 2, wherein the boron nitride crystal contained in the ceramics sintered body has a C-axis lattice constant of 6.675 angstroms or less, and the ceramics sintered body has an oxygen amount of from 1 to 2% by weight.

* * * * *

UNITED STATES PATENT AND TRADEMARK OFFICE
CERTIFICATE OF CORRECTION

| | | |
|---|---|---|
| PATENT NO. | : 7,632,768 B2 | Page 1 of 1 |
| APPLICATION NO. | : 10/582627 | |
| DATED | : December 15, 2009 | |
| INVENTOR(S) | : Yokota et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 313 days.

Signed and Sealed this

Twenty-first Day of December, 2010

David J. Kappos
*Director of the United States Patent and Trademark Office*